UNITED STATES PATENT OFFICE.

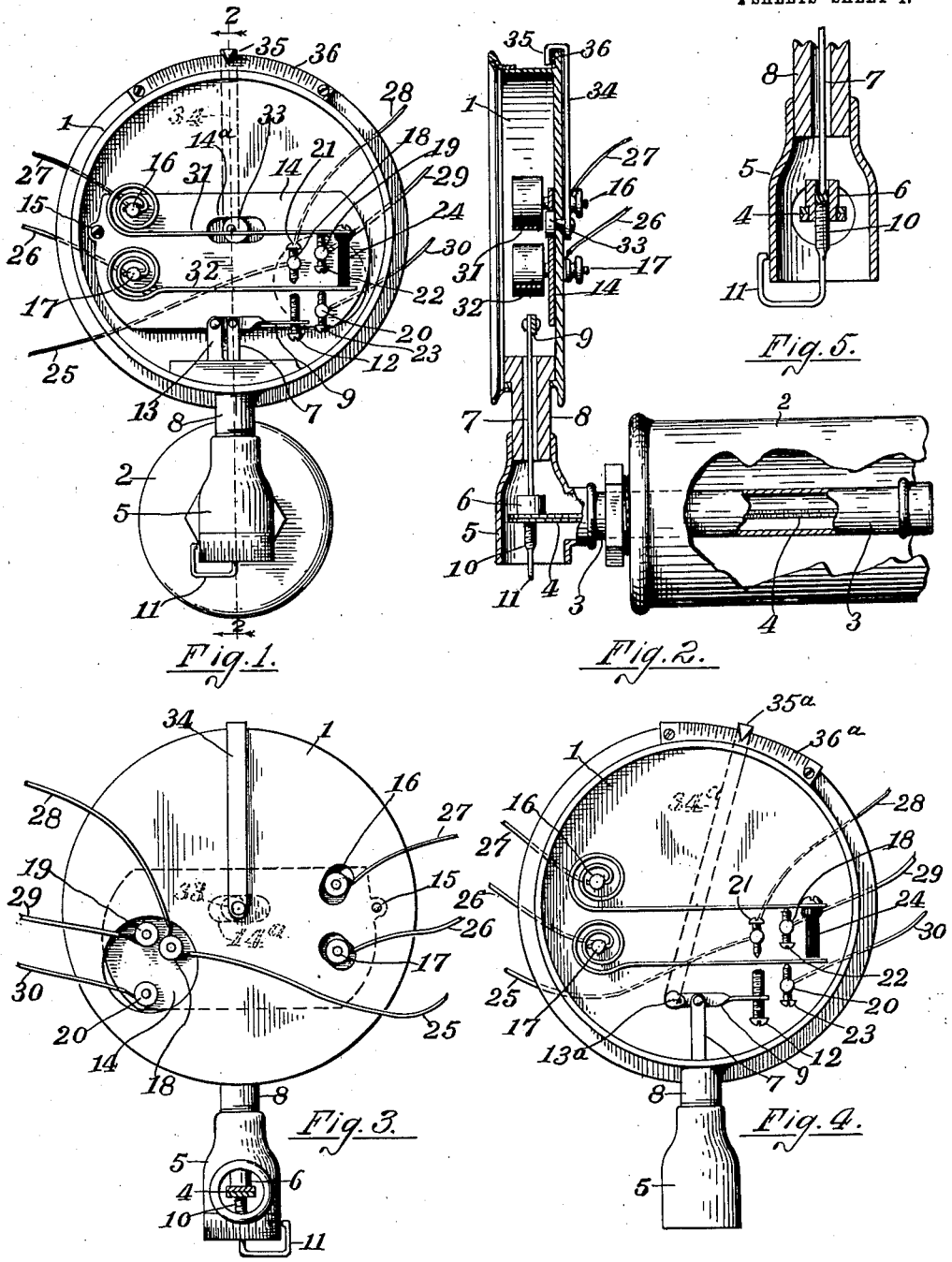

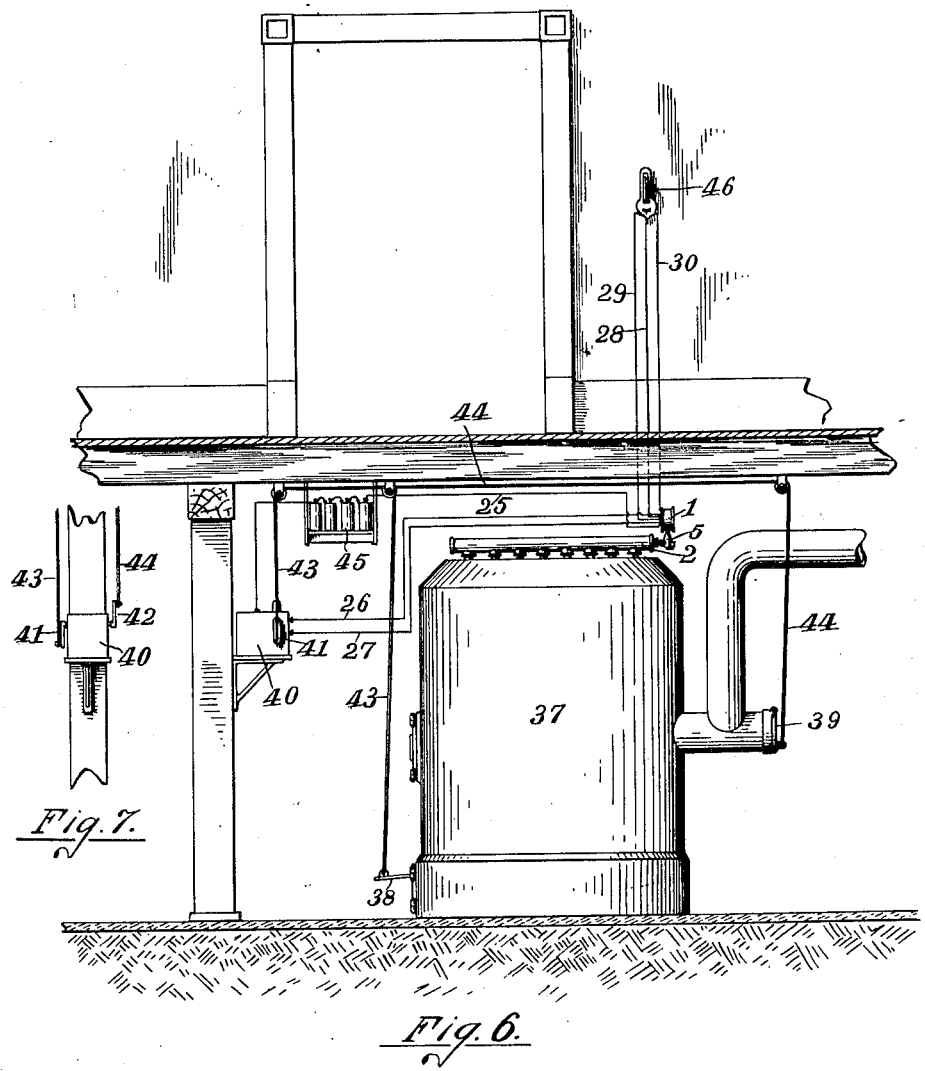

RUEL E. DEWEY, OF GRAND RAPIDS, MICHIGAN.

THERMOSTAT DAMPER-REGULATOR.

No. 926,391.        Specification of Letters Patent.        Patented June 29, 1909.

Application filed February 13, 1909. Serial No. 477,793.

*To all whom it may concern:*

Be it known that I, RUEL E. DEWEY, a citizen of the United States of America, residing at Grand Rapids, in the county of Kent and State of Michigan, have invented certain new and useful Improvements in Thermostat Damper-Regulators; and I do hereby declare the following to be a full, clear, and exact description of the invention, such as will enable others skilled in the art to which it appertains to make and use the same.

My invention relates to improvements in thermostat damper regulators, and its object is to provide means whereby electrically operated dampers may be governed by means of two separate thermostats, one of which is exposed to the temperature of the heating medium in the boiler or other source of supply, and the other thermostat located at a distance therefrom in the apartment or room in which the heat is to be regulated by shifting the dampers.

My invention consists essentially of certain improved means for shifting the electric circuits which operate the dampers whereby the thermostat in the room will operate to open and close the dampers in the usual way; and means whereby when the other thermostat will come into action and will cut out the circuit of the first thermostat and close the dampers when the temperature of the heating medium rises, and again restore the circuit of the other thermostat when the said temperature falls; to provide the device with various means for adjusting the same to operate at a predetermined temperature of the heating fluid, and to provide the device with various new and useful features hereinafter more fully described and particularly pointed out in the claims.

It is desirable, especially in hot water systems, that the water in the boiler should not rise to a sufficient temperature to generate steam in which event the steam is liable to interfere with the operation of the system. It also frequently occurs that when the water in a heating system is rapidly heated that it attains a temperature so high that before the room or apartment becomes heated sufficient to act upon the thermostat therein and close the dampers, the heat of the water is so great that after the dampers are closed, the room will be overheated before the water cools off, and thus the regulation is defective. I overcome these difficulties by providing, in addition to the usual thermostat located in the apartment to be heated, and connected to a motor to open and close the dampers, an additional thermostat which is exposed to the heat of the water or other heating fluid and provided with adjusting means whereby it will come into action to independently close the dampers whenever the water reaches the maximum temperature determined upon, and at the same time cut out the electric circuit of the thermostat in the apartment and cut out its own circuit and restore the circuit of the thermostat in the room, whenever the temperature of the fluid again falls, so that by this double thermostat arrangement for operating the dampers, they will be closed and opened either by increase of the temperature of the fluid in the boiler, or by change of temperature in the room, thus securing more accurate regulation than heretofore, as will more fully appear by reference to the accompanying drawings, in which:

Figure 1 is a front elevation of a device embodying my invention; Fig. 2 a vertical section of the same on the line 2—2 of Fig. 1; Fig. 3 a rear elevation of the same. Fig. 4 a front elevation of a modification of the adjusting means; Fig. 5 an enlarged vertical section of the adjusting means in the lower part of Figs. 1, 2, and 3 at right angles to Fig. 2. Fig. 6 an elevation showing the application of my device to a heating system; and Fig. 7 a detail showing the motor at right angles to Fig. 6.

Like numbers refer to like parts in all of the figures.

1 represents a circular case substantially the same as the case of a steam gage.

2 represents any convenient chamber or portion of the boiler containing the heating fluid to operate the heating system. This chamber may be either a portion of the boiler itself, or closely connected therewith in such a manner that the fluid therein will be substantially of the same temperature as that in the boiler.

3 is a tube inserted in this chamber and externally exposed to the fluid therein and heated thereby, being closed at the inner end and open at the outer end. This tube 3 contains a thermostat member 4 in the axis thereof and both extend outside the chamber 2, the outer end of the member 4 being in a T-head and vertically movable therein by virtue of the unequal expansion of the metal of which it is exposed in the usual way.

6 is a nut mounted on the movable end of the member 4 and extending upward therefrom is a push rod 7, the lower end of which rod rests upon a vertically adjustable screw 10 provided with an extension 11 to manually adjust the screw, which extension also is prolonged upward outside of the T-head 5 to indicate the adjustment of the screw in the nut. The upper end of the rod 7 is pivoted to a horizontally disposed lever 9 close to one end thereof, which end is pivoted to a hanger 13, the other end of the lever being provided with an adjustable screw 12 to engage a spring electrode 32 fixed at one end in a binding post 17 and vertically movable at the other end. On this binding post 17 extends a conductor 26 to operate a motor 40 to close the damper 38 and open the air check 39 whenever this circuit is closed. Above the electrode 32 is a similar electrode 31 arranged parallel therewith and attached to another binding post 16, which latter is connected by a conductor 27 extends to the motor and is arranged to reverse the same when the outer circuit is closed, to open the damper and close the air check. These electrodes are spaced apart at their movable ends by a nonconducting stud 24 attached to the one electrode 31 extending close to the other electrode 32. These electrodes normally rest upon adjusting screws 22 and 23 in binding posts 18 and 20, which posts are connected by wires 29 and 30 to a thermostat 46 of the usual construction located in the room or apartment, the heat of which is to be regulated, the connections being made so that when the temperature falls the circuit through wire 29 is closed, thus opening the damper 38 and closing the air check 39, and when the room becomes too warm, the thermostat closes the circuit through the wire 30 and thus closes the said damper and air check. A binding post 18 is also provided from which extends a conductor 25 to the battery 45 to operate the motor, and another conductor 28 to the thermostat in the room to supply battery current when the thermostat closes either of the opening or closing circuits. This post 18 has an adjusting screw 21 therein to engage the lower electrode 32 when the same is raised in contact therewith by the thermostat member 4, thus closing the circuit from the battery to the motor through the wire 26 to close the dampers and at the same time moving both electrodes out of contact with the screws 22 and 23, thus cutting out the thermostat in the room. Whenever the temperature of the fluid in the chamber 2 falls, the member 4 will lower the arm 9 and thus restore the circuit through the thermostat in the room, which will then operate in the usual way so long as the temperature in the chamber 2 remains below the limit.

In the event that I use the adjustment shown in Figs. 2 and 5 and at the bottom of Figs. 1 and 3, the various binding posts described may be fixed in the case as shown in Fig. 4. If, however, I use the device shown in the upper part of Fig. 1, these binding posts are all mounted on a plate 14 pivoted to the case at one end as at 15 and provided with a slot 14 at the axis of the case in which slot is journaled an eccentric 33, whereby the plate 14 is vertically adjusted by means of a lever 34 connected to the eccentric to rotatively adjust the same and having an index 35 at its upper end traversing a scale 36 on the rim of the case.

Fig. 4 embodies a modification of this last described adjustment whereby the lever 9 is eccentrically pivoted on a rotative member 13$^a$ and the posts fixed in the case, whereby the pivoted end of said lever is vertically adjusted by means of an arm 34$^a$ attached to said member and having an index 35$^a$ traversing a scale 36$^a$ on the rim of the case.

Any one of these methods of adjustment will obviously operate substantially the same, in that they will each render the member 4 operative earlier or later as the adjustment thereof may be made.

What I claim is:—

1. A thermostatic damper regulator, comprising an electric circuit for opening the dampers, an electric circuit for closing the dampers, a thermostat to alternately close said circuits, means for breaking the opening circuit and simultaneously closing the closing circuit, and a second thermostat exposed to the direct action of the heating fluid to operate said means.

2. A thermostatic damper regulator, comprising an electric circuit for opening the dampers, an electric circuit for closing the dampers, a spring electrode in each circuit adapted to close and open the same, a battery circuit to operate said circuits and having a contact engaged by the spring electrode of the closing circuit, a movable member adapted to move both spring electrodes to open both circuits and also to engage the spring electrode in the closing circuit with the terminal in the battery circuit, and a thermostat exposed to the heating fluid and connected to said movable member to operate the same.

3. A thermostatic damper regulator, comprising an electric circuit to close the dampers, an electric circuit to open the dampers each circuit having a spring electrode, a terminal normally in contact and spaced apart by a non-conducting stud, a battery circuit having a terminal engaged by the spring electrode in the closing circuit, a lever adapted to move the spring electrode, means for adjusting the distance between the lever and said electrode to determine the temperature required to break the circuits, a thermostat member connected to said lever to operate the same, and also exposed to the temperature of the heating medium.

4. A thermostat damper regulator, comprising a circuit to close the dampers, a circuit to open the dampers, two binding posts in each circuit spaced apart, a spring terminal in each circuit carried by one binding post and engaging an adjustable terminal carried by the other binding post, said spring terminals being spaced apart in parallel planes and simultaneously movable, a battery circuit having a binding post, an adjustable terminal in the battery circuit adapted to engage the spring terminal in the damper closing circuit when said terminal is moved out of contact with the terminal in the said closing circuit, a pivoted lever adapted to move said spring terminal, a rod engaging said lever to move the same, a thermostat member engaging said rod at its movable end and adapted to be exposed to the temperature of the heating fluid of the system.

5. A thermostat damper regulator, comprising an electric circuit to close the dampers, an electric circuit to open the dampers, means for simultaneously opening said circuits and closing the damper closing circuit, a lever to operate said means, said lever being eccentrically pivoted to one end, an arm to adjust said pivot, and a thermostat member connected to said lever to move the same, and adapted to be exposed to the temperature of the heating medium of the system, whereby when said medium becomes over heated, both opening and closing circuits will be opened and the closing circuit again closed by the operation of said lever.

6. A thermostatic damper regulator, comprising an electric circuit for closing the dampers, an electric circuit for opening the dampers, a spring electrode in each circuit and spaced apart by a non-conducting stud, a lever to move said spring electrodes and break the circuits, a battery circuit having a terminal to engage the spring electrode in the closing circuit when said circuits are so opened, a lever eccentrically pivoted at one end and adapted to operate said electrode at the other end, an arm to adjust said eccentric pivot, an index on the arm, a scale traversed by the index, and a thermostat member connected to the lever to operate the same and adapted to be exposed to the temperature of the heating medium of the system.

In testimony whereof I affix my signature in presence of two witnesses.

RUEL E. DEWEY.

Witnesses:
GEORGIANA CHACE,
LUTHER V. MOULTON.